(No Model.)
C. L. GODDARD.
CLOTH STRETCHING MACHINE.
No. 479,501. Patented July 26, 1892.
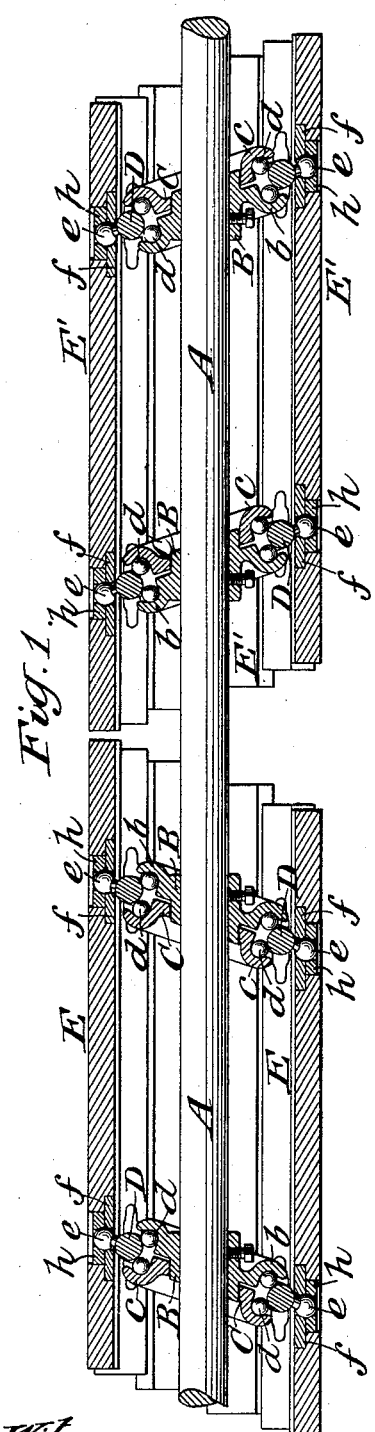
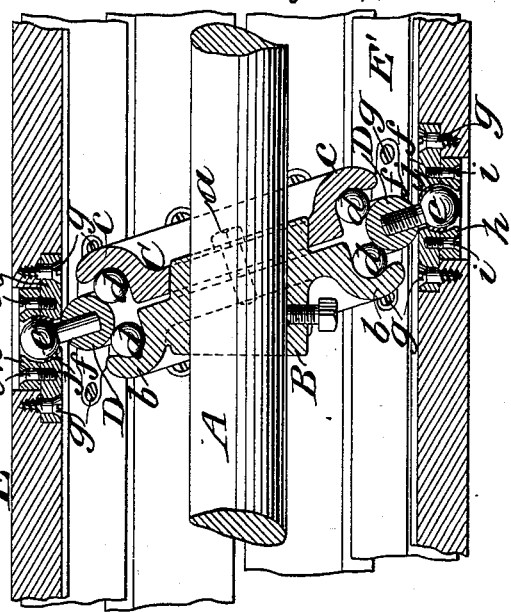
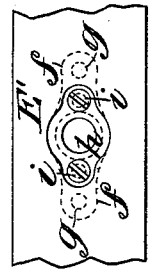
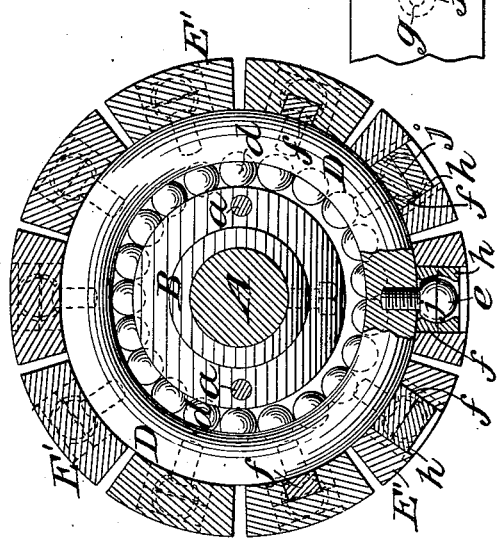
Witnesses:
Inventor:
Calvin L. Goddard
by attorneys

UNITED STATES PATENT OFFICE.

CALVIN L. GODDARD, OF NEW YORK, N. Y.

CLOTH-STRETCHING MACHINE.

SPECIFICATION forming part of Letters Patent No. 479,501, dated July 26, 1892.

Application filed March 10, 1892. Serial No. 424,423. (No model.)

*To all whom it may concern:*

Be it known that I, CALVIN L. GODDARD, of the city and county of New York, in the State of New York, have invented a new and useful Improvement in Cloth-Stretching Machines, of which the following is a specification.

This invention relates to that class of cloth-stretchers in which the stretching or spreading bars or slats forming the periphery of a cylinder are carried upon rings which rotate upon heads which are set obliquely to a fixed central shaft, about which said rotation takes place.

The improvement consists in certain combinations hereinafter described and claimed, including such bars or slats, rings, heads, and shaft, whereby the stretcher is made to work with greater freedom, less friction, and better effect.

Figure 1 represents a central longitudinal sectional view of a cloth-stretcher embodying my invention. Fig. 2 represents a central longitudinal sectional view of part of the stretcher on a larger scale than Fig. 1. Fig. 3 is a transverse sectional view corresponding with Fig. 2. Fig. 4 is a face view of a portion of one of the spreading-slats.

Similar letters of reference designate corresponding parts in all the figures.

A is the central stationary shaft, upon which are secured obliquely to its axis the series of circular heads, each of which is represented as composed of a flanged hub B and a flanged annular plate or disk C, secured to the said hub by bolts $a$, passing through them. Half of the said heads are set obliquely to the shaft in one direction for carrying one set of slats E and the other half obliquely thereto in an opposite direction for carrying the other set of slats E'.

D are the slat-carrying rings, one for each head, surrounding the head between the flange $b$ of the head B and the flange $c$ of the disk C.

Between each ring D and the flanges $b$ and $c$, respectively, are washers, which in the example represented consist each of a series of balls $d$. The flanges $b$ and $c$ of the heads B and C are made concave on their inner or opposite faces to conform to the balls of the washers and to slightly overlap the said balls, as best shown in Fig. 2, so as to retain said balls in place between the slat-carrying rings and the heads. The slats E E' are represented as attached to their carrying-rings D D by means of ball-headed pins $e$, the shanks of which are inserted into holes in the exteriors of their respective rings, as shown at the top of Fig. 2, or screwed into the said holes, as shown at the bottom of Fig. 2, the ball-heads projecting far enough outside of the rings to allow the heads to seat themselves in concave sockets formed in plates $f$, which are screwed or countersunk into the inner faces of the slats, as shown in Fig. 2, and fastened thereto by screws $g$. This forms a ball-and-socket or universal joint between the slats and their rings. When the shanks of the ball-headed pins $e$ are screwed into the rings D, they will of themselves, when seated in the socket-plates $f$, connect the slats with their rings, or in case the shanks of the said pins are merely inserted into the holes in the said rings the connections of the slats with the rings D are completed by cap-plates $h$, fastened by screws $i$ to the socket-plates $f$, the said cap-plates being also countersunk into the outer faces of the slats. Washers $j$ $j$ are represented (see Fig. 2) between the balls and their sockets. The rotary motion given to the slats by the contact of the cloth passing over them and transmitted through the slats to the rings D about the heads B C produces a longitudinal movement of the slats parallel with the shaft, and the cloth coming first in contact with the two series of slats when they are nearest together, as shown at the top of Fig. 1, is spread by the outward longitudinal movement of the slats as it continues to move over the shaft in the way common to stretchers of this class, but with less friction and less liability to combine, and consequently with greater effect.

What I claim as my invention, and desire to secure by Letters Patent, is—

1. The combination, with a fixed central shaft and a surrounding series of parallel slats, of flanged hubs arranged fixedly upon the said shaft with their flanges oblique to the axis thereof, flanged annular disks affixed to said hubs, rotary slat-carrying rings arranged between the flanges of said hubs and disks, and loose washers interposed between said rotary rings and the flanges of said hubs and disks, substantially as herein described.

2. The combination, with a fixed central shaft and a surrounding series of parallel slats, of hubs having concave flanges arranged fixedly upon said shaft with the said flanges oblique to the axis thereof, annular disks having concave flanges affixed to said hubs, rotary slat-carrying rings arranged between the flanges of said hubs and disks, a loose washer composed of series of balls interposed between said rotary rings and the concave flanges of said hubs and disks and retained by the concavity of said flanges, substantially as herein described.

3. The combination, with the stationary shaft and the oblique heads affixed thereto, of a slat-carrying ring arranged to rotate about said heads, ball-headed pins inserted in said ring, and slats having concave sockets for the reception of the ball-heads of the pins, substantially as herein set forth.

CALVIN L. GODDARD.

Witnesses:
FREDK. HAYNES,
GEORGE BARRY.